(12) United States Patent
Cantero Escolà et al.

(10) Patent No.: US 8,295,470 B2
(45) Date of Patent: Oct. 23, 2012

(54) SYSTEM AND PROCEDURE FOR COMMERCIAL COMMUNICATIONS

(75) Inventors: José Luis Cantero Escolà, Molins de Rei (ES); Alex Bisbe Tosat, Sant Cugat del Valles (ES)

(73) Assignee: Whisbi Technologies S.L., Barcelona (ES)

( * ) Notice: Subject to any disclaimer, the term of this patent is extended or adjusted under 35 U.S.C. 154(b) by 231 days.

(21) Appl. No.: 12/815,476

(22) Filed: Jun. 15, 2010

(65) Prior Publication Data

US 2011/0305328 A1  Dec. 15, 2011

(51) Int. Cl.
*H04M 3/00* (2006.01)
(52) U.S. Cl. .............. 379/265.09; 379/93.12; 379/93.17
(58) Field of Classification Search .............. 379/93.12, 379/88.13, 265.09, 93.17; 348/14.01, 14.08
See application file for complete search history.

(56) References Cited

U.S. PATENT DOCUMENTS

| 6,771,766 B1 * | 8/2004 | Shafiee et al. ........... 379/265.09 |
| 7,433,459 B2 * | 10/2008 | Reding et al. ............ 379/265.09 |

* cited by examiner

*Primary Examiner* — Olisa Anwah
(74) *Attorney, Agent, or Firm* — Gottlieb, Rackman & Reisman, P.C.

(57) ABSTRACT

System comprising a server of webpages (2) containing a form which is accessible from a remote computer (52) by the user, a main server (1) and a number of contact centers (4) which have, at least, a telephone terminal (43), a computer (44) and a webcam (41) connected to a videoconferencing server (42), to link an agent to the user, and a PBX or secondary automatic private center (3) connected to the main server (1) to establish a telephone connection between the user and the agent, and the main server (1) comprises routing means of the computer (44) and of the videoconferencing server (42) of the contact center (4). The procedure consists in that, once the form has been filled out, the PBX carries out a call to the user, and if picked up, searches for the most appropriate contact center, establishing a direct telephone communication, while the main server (1) creates a videoconference virtual room through which the unidirectional video transmission of the webcam (41) is routed exclusively for the user.

14 Claims, 2 Drawing Sheets

SYSTEM AND PROCEDURE FOR COMMERCIAL COMMUNICATIONS

OBJECT OF THE INVENTION

The present invention relates to a system for commercial communication, specifically to a system which allows a person or client using an internet-connected computer to establish communication with a commercial agent bidirectionally on audio and unidirectionally on video, in which said user can see the commercial agent and the products and documents shown by the agent on the computer screen.

FIELD OF APPLICABILITY OF THE INVENTION

The field of applicability of the present application is the field of marketing and commercial communication techniques, as well as customer care in companies of public access products and services.

BACKGROUND OF THE INVENTION

Nowadays, contact centres and call centres are more common, for assisting the consumer of certain companies, and also providing information generally. For example, a centre of telesales or of distance offer of services and articles to a consumer user can follow one of two main paths. A first option is telephone contact, in which the salesman/saleswoman calls a user to offer his/her products and services. In this situation, the user may feel uncomfortable, since the call has not been done directly by the user, and therefore, except when the product is needed at that very moment, the contact is not very fruitful. In addition, the flow of information crossing between the salesman/saleswoman or agent, and the user, is limited to the only-audio channel of the telephone. In other cases, the user can call the salesman/saleswoman after seeing an advertisement of the product or service which is potentially of interest to him/her. However, this mode of commerce implies a costly offer campaign must first be carried out to get to the possible consumer user.

Another path for establishing distance contact, telesales or support and information is by using computers connected to the Internet, and by the publication of promotional webpages hosted in an appropriate server. By using said online mode of communication, the user, primarily the interested user, can search for the product potentially of interest and make contact with the salesman/saleswoman or agent who is offering the products and services. However, the use of webpages limits the direct contact between salesman/saleswoman, the informer or host, and the user, which is often vital for providing more information and for stimulating the interest of the user.

In an attempt to solve this last problem, some webpages provide videoconference services, allowing the user to contact an agent through direct communication. However, such communication has certain problems.

Thus, in some cases, videoconference or telepresence systems are used. These systems, which require that both user and provider are provided with specific equipment for using IP voice technology (voice over the Internet), require the user to have a computer equipped with a microphone and headphones appropriately installed and configured for use. In certain cases, a videoconference also requires that the user makes use of video cameras such as webcams, further complicating the connection, since not all users have this equipment or a compatible installation.

En certain situations, the equipment used is an integrated and specific videoconference equipment, which is not widely used and therefore would only be useful form small number of users.

These videoconference systems use a high bandwidth connection and are therefore not robust when used with connections of insufficient bandwidth, leading to interruptions and delays in voice reproduction, not being adequate for maintaining conversation fluency. In addition, the most common domestic connections, for example ADSL, have a reduced upload speed compared to the download speed, and therefore the communication in the direction user to agent is very limited. An added difficulty is that these systems require that the user downloads or installs additional software or a plug-in specific to the browser used, to provide the programs and protocols means appropriate for establishing the communication. This can be troublesome and difficult to do, depending on the computer used by the user.

A system proposed by the applicant comprises a number of nodes with a server of webpages which is accessible to the user by use of a remote computer. This web server comprises a form which is filled out by the user, comprising said form a field for introducing at least the telephone number of the user, which can be of a mobile telephone or of a landline telephone, in such a way that from the node a telephone call to the user is handled, allowing to establish a bidirectional audio communication of good. The node comprises a node or main server with databases, controlling a number of video-image servers and contact centre positions. These positions comprise at least one webcam or video-camera connected to the videoconference server, a telephone terminal connected to a switchboard, and optionally a computer connected to said remote server, in such a way that, through a monitoring server, a complete node is generated. Once the user has filled out the form with the telephone number, the node calls said telephone and connects the user to an agent in a contact centre.

The contact established comprises a bidirectional audio telephone communication between the user and the agent, and a unidirectional video communication from the agent in the contact centre to the user's computer, reducing bandwidth requirements during data transmission.

However, this system has the disadvantages of the node requiring a physical location with monitorization of the different contact centres, and that the telephone switchboard used will limit the number of agents that can be working at any one time. This reduces the efficiency of the service, because monitoring of available agents uses up time and the connection is established by the agent after a certain loss of time while the user answers the call. In addition, it is difficult to implement various services in the same contact node because the structure grows without any possibility of geographic distribution or scalability.

DESCRIPTION OF THE INVENTION

The system and procedure for commercial communications, object of the present invention, has a number of technical features aimed at making flexible the location and access of contact centres, increasing their efficiency and allowing the conformation of a flexible structure.

The system is such that it comprises a server of webpages connected to the Internet for access from a remote computer by the user, said server of webpages being associated to a main Internet-connected server which has at least one management-storage database and means for automatic telephone connection to a number of contact centres, these contact centres having at least one telephone terminal, a computer connected to a global network and a webcam for connecting an agent to the user through a videoconference server. This type of communications allow the user to establish immediate contact with a commercial agent in the same way as in a personal interview in an office, without having to move from home or other location, ensuring optimal quality of the communication for maintaining a conversation and the data flow between said user and the agent with reduced bandwidth requirements.

According to the invention, the telephone communication means are formed of at least a PBX or secondary automatic private centre connected to the main server for establishing a telephone connection between the user and the agent, and the main server comprises routing means for the computer and the videoconference server of the contact centre. The system enables the bidirectional transmission of voice between the agent and the user, through telephone communication between the telephone terminal of the agent and the landline or mobile telephone of the user, and the unidirectional transmission of video from the webcam of the contact centre to the remote computer of the user.

The system allows to establish during a user session or query, a first channel of bidirectional audio communication while, in turn, the browser opens a window or full screen with the video transmission from the agent to the remote computer of the user, therefore allowing to establish an initial conversation under optimal conditions. This system allows to obtain several important advantages, which consist in that the data flow required in the Internet connection of the user is low, because only video data are transmitted from agent to user, and the sound quality of telephone communication is superior to that of IP voice or of voice over the Internet, said communication being totally independent and unaffected by transmission interruptions due to data bandwidth being exceeded.

The main advantage obtained consists in that the system is one hundred percent of universal access, as the connection of the contact centre is totally decentralized from the main server through the use of the PBX or secondary automatic private centre and the routing of data through global nets such as the Internet. The different contact centres can be of monosite type with a single computer, telephone terminal or webcam, or have several sites connected to the same videoconference server. In addition, said contact centres can be sited at the desired location as long as they have a telephone and data connection, for example in a workshop of a technical assistance service located in different buildings or in different countries, since it is not necessary to monitor the contact centre directly nor the permanent attention of the agent to the possible initiation of a session during configuration, but rather the response of said agent on the telephone terminal confirming that communication can be established.

This system allows the data flow required in the Internet connection of the user to be low, since only video data are transmitted from the agent to the user, and the quality of sound on the telephone es superior to that of IP voice or of voice over the Internet, said communication being totally independent and unaffected by transmission interruptions due to data bandwidth being exceeded.

A service offered using this system allows the availability of 24-hr attention by using different locations for agents or contact centres.

The image of the webcam or video camera is transmitted in a compatible format which can be reproduced in the browser of the remote computer of the user, for example Adobe Flash®.

The routing means of the main server are enabled in software mode, mainly in the form of a environment for creation and maintenance of videoconferencing virtual rooms, in which connection parameters are established at the logic level between the remote computer of the user and the computer of the contact centre, and for access to other documents and data stored by the main server according to the nature of the service or product selected in the contact form.

Thus, the procedure is such that it comprises filling out a form from a site of webpages by the interested user, including at least the introduction of the telephone number of said user, among other optional details.

According to the invention, the procedure is continued, once the form has been obtained, following the steps of:

transmission of the telephone number, the data in the form and a service code to the main server, said service code being generated from the data in the form, activation of the central secondary automatic private PBX to carry out a call to the telephone number of the user, and waiting until picked up by the user, once the connection is established between the secondary automatic private centre and the telephone of the user, the main server searches in a database the number of the telephone terminal associated to the service code, and makes a call to said telephone terminal of the contact centre, transmitting to the contact centre the connection code for the agent.

The agent in the contact centre picks up the telephone terminal.

The automatic secondary private centre links the telephone of the user to the telephone terminal of the contact centre to establish a bidirectional audio communication, and the main server creates, in the videoconferencing server, a videoconference virtual room to which the remote computer of the user gains automatic access.

the agent of the contact centre introduces the connection code received from the telephone (this code is the telephone number from which the call is made), in a computer connected to a webpage designed to this effect, giving immediate access to the videoconference virtual room. The computer of the contact centre can have a webcam for unidirectional video communication.

The database comprises, for each form filled out by a user, a unique register comprising as fields, at least, a unique identifier, the data in the form, the telephone number of the user, the service code generated from the form, the number of the telephone terminal of the contact centre, a connection code for the contact centre and the routing to the videoconference virtual room in which the remote computer of the user, the videoconferencing server and the computer of the contact centre are connected.

In a practical embodiment, the secondary automatic private centre makes a call to the telephone terminal of the contact centre using as number of telephone identification, the connection code. In this way, the agent sees in the telephone terminal having caller identification the connection code as the incoming call, which is clearly accessible and usable in an intuitive way.

The main server configures the videoconferencing virtual room with a videoconference room format stored in a database and selected according to the service code, in the form most appropriate to the nature of the product or service the user is interested in.

In an embodiment, the main server enables in the videoconference virtual room a bidirectional communication service of low bandwidth between the remote computer of the user and the computer of the contact centre. These services, for example a text-based chat, are designed to facilitate the exchange of brief written information without substantially altering the bandwidth needed in the communication of data, especially in the upload flow of the user, which is usually the most limited.

It also makes possible for the agent to transmit files, images, photographs, videos, presentations and other documents from the database of the main server, or even to provide this information directly from the agent's computer to the central videoconferencing server and thus to the remote computer of the user.

The PBX or secondary automatic private centre monitors the telephone conversation between the agent of the contact centre and the user, so that, in the moment when said telephone communication is ended, the videoconference virtual room is eliminated, disconnecting the contact centre and the remote computer of the user, and the connection code assigned to the user is released.

As needed, the procedure comprises the transmission of images and visual data from the database of the main server to the videoconference virtual room to which the remote computer of the user is connected.

Another advantage obtained is the increase of the efficiency of the agents and contact centres, as these must only serve the session or enquiry of the client when he/she is already online, not being necessary for said agent to be ready and in wait for the client to pick up the telephone and the videoconference session is initiated and configured, in which case, if the call was not successful, the waiting would have been unfruitful. The system allows to detect and solve communication problems, for example the incorrect introduction by the user of the telephone number in the form leading to the impossibility to establish contact, or that the user is engaged during the call attempt, without any real videoconference session having been established, nor the agent being idle in wait for the establishment of the communication. The system also allows to reconduct the process of connecting in the case the agent in a contact centre does not reply, by diverting the call to another contact centre meeting the same or analogous requirements.

The number of agents is irrelevant to the system, as these only gain access to it when catering for a user during a session, and they do not need a permanent connection or monitoring.

DESCRIPTION OF THE FIGURES

To complement the foregoing description and with an aim to facilitate the better understanding of the features of the invention, attached to the present descriptive memory is a set of drawings in which, by way of illustration and not limitation, the following is shown.

PREFERRED EMBODIMENT OF THE INVENTION

Figure 1:
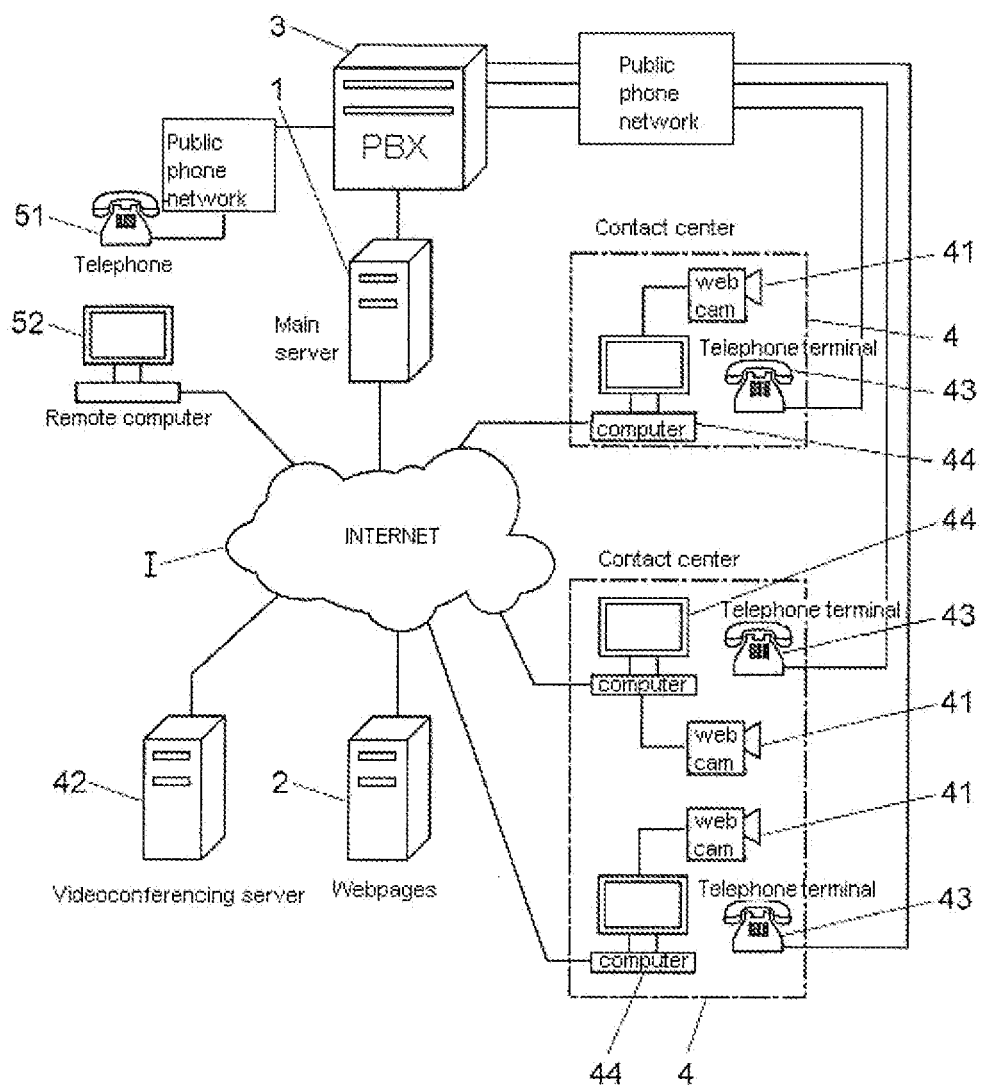
FIG. 1 shows a scheme of the structure of the system.

As can be seen in the mentioned figures, the system is formed by a main server (1) connected to the Internet (I), said main server (1) being associated to a server of webpages (2), which is also connected to the Internet (I), in which the webpage of origin is installed containing a form for the user, and a telephone PBX or secondary automatic private centre (3). The system comprises a number of contact centres (4) with a number of agents catering for the user. In these contact centres at least a webcam (41) associated to a computer (44) of the agent, and a telephone terminal (43) can be found, allowing to establish an audio communication with the telephone (51) of the user through the telephone line, and an unidirectional video communication from the webcam (41) of the contact centre (4) to the remote computer (52) of the user through a videoconference virtual room created on the Internet (I)-connected videoconferencing server (42), and optionally the transmission of data and the exchange of information of low bandwidth between both computers (44, 52), for example through text-based chat, always communicating this information to the videoconferencing server (42), which serves it to the appropriate party.

The main server (1) comprises an internal database (not shown) with information about the articles or services which are the object of telesales, for the agent to provide images, presentations, photographs or videos of the database to the remote computer (52) of the user through the Internet (I) connection; routing means of the videoconference virtual rooms, in this case implemented in software, a listing of the numbers of the telephone terminals (43) of the contact centres (4) and other documents in digital format.

In an embodiment, the videoconference virtual room is hosted on a videoconferencing server in the contact centre, catering for one or more agent positions, the videoconferencing server being connected to the Internet.

Figure 2:
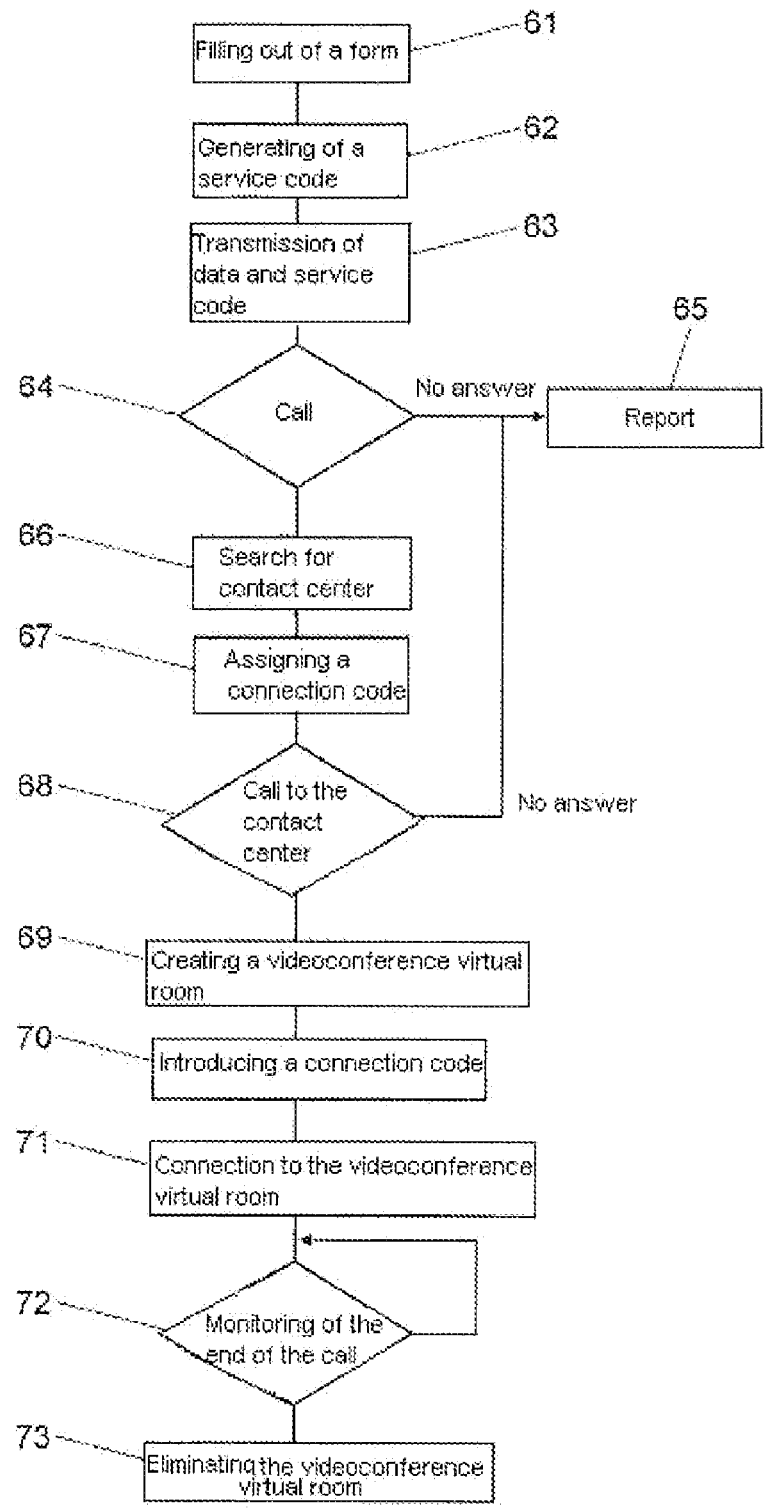
FIG. 2 shows a flow diagram of the process, from the moment of first contact or session initiation to the end thereof.

The procedure of the invention, shown schematically as a flow diagram in FIG. 2, comprises the filling out of a form (61) by the user with data, including the telephone number (51) of said user, generating a service code (62) from certain details in said form, transmitting (63) these details in the form and the service code to the main server (1). The main server (1) activates the secondary automatic private centre (3) so it carries out a call (64) to the telephone number (51) of the user and waits until the user picks it up. Otherwise, the main server (1) sends a report (65) to the user through the webpage displayed on the remote computer (52). In the case the user picks up the telephone (51) of the user, the main server (1) searches (66) in the database for the number of the telephone terminal (43) of the contact centre (4) which is associated to the service code, and by assigning a connection code (67) carries out a call (68) to this telephone terminal (43). In the case the call (68) is not answered, another appropriate contact centre (4) is found or a report is generated (65) of the failure to establish contact.

If the agent in the contact centre (4) picks up the telephone, the secondary automatic private centre (3) establishes the communication between both telephones (43, 51) and the main server (1) creates a videoconference virtual room (69), according to a format associated to the service code in the form. The agent who has answered the call (68) introduces a connection code (70) in the computer (44) for the connection to the mentioned videoconference virtual room (71) through the routing means of the main server (1) from the computer (44) and the videoconferencing server (42) of the contact centre (4) to the remote computer (52) of the user.

The secondary automatic private centre (3) monitors the end of the call (72) until communication is ended, that is when the telephone communication between the user and the agent of the contact centre is ended, the videoconference virtual room (73) is eliminated, disconnecting the contact centre (4) and the remote computer (52) of the user, and the connection code assignment of the user is released.

After describing sufficiently the nature of the invention, as well as an example of a preferred embodiment, and for such purposes as may arise it is recorded that the materials, shape, size and organization of the described elements can be modified, as long as this does not imply any alteration to the essential features of the invention as claimed below.

The invention claimed is:

1. A system for commercial communications comprising:
a server of webpages (2) connected to the Internet (I) for access from a remote computer (52) by the user, said server of webpages (2) being associated to a main server (1) connected to the Internet (I) with at least a management-storage database and at least an automatic device for telephone connection to a number of contact centres (4), these contact centres (4) being provided with at least one telephone terminal (43),
a computer (44) connected to the Internet and a webcam (41), and at least one video transmission component for unidirectional transmission of video through a videoteleconferencing server (42) connected to the Internet for establishing contact between an agent and the user,
a telephone communication device formed of at least a PBX or secondary automatic private centre (3) connected to the main server (1) for establishing a telephone connection between the user and the agent, and the main server (1) including a routing component for the computer (44) and the videoconferencing server (42) of the contact centre (4), enabling the bidirectional transmission of voice between the agent and the user, through the telephone communication of the telephone terminal (43) and the landline or mobile telephone (51) of the user, and the unidirectional transmission of video from the webcam (41) of the contact centre (4) to the remote computer (52) of the user, said remote computer generating form (61) at a webpage site based on information from an interested user, the form including the telephone number (51) of the interested user
wherein the main server (1) is adapted to receive a transmission (63) including the telephone number (51) of the user from the form and a service code generated from the form (61) and to cause the activation of the PBX or secondary private centre (3) to carry out a call (64) to the telephone number (51) of the user;
wherein once a connection is established between the secondary automatic private centre (3) and the telephone (51) of the user, the main server (1) is adapted to search (66) in a database for the number of the telephone terminal (43) associated to the service code, and to carry out a call (68) to this telephone terminal (43) of the contact centre (4), transmitting to the contact centre (4) a connection code (67) for the agent;
wherein once the agent in the contact centre (4) picks up the telephone terminal (43), the secondary automatic private centre (3) is adapted to link the telephone (51) of the user to the telephone terminal (43) of the contact centre (4) for establishing a bidirectional audio communication, and the main server (1) is adapted to create in the videoconferencing server a videoconference virtual room to which the remote computer (52) of the user automatically gains access;
and wherein once the agent in the contact centre (4) introduces the received connection code (70), received through the telephone, the computer (44) of the contact centre (4) is adapted to route the unidirectional videoteleconferencing to the videoconference virtual room (71).

2. A procedure for commercial communications, initiated by the filling out of a form (61) in a webpage site, by the interested user, comprising at least the introduction of the telephone number (51) of said user, among other details, characterized in that it comprises the steps of:
transmission (63) to the main server (1) of the telephone number (51), the data in the form and a service code, said service code being generated (62) from the data in the form,
activation of a PBX or secondary automatic private centre (3) so it carries out a call (64) to the telephone number (51) of the user and waits until the user picks it up,
once the connection is established between the secondary automatic private centre (3) and the telephone (51) of the user, the main server (1) searches (66) in a database for the number of the telephone terminal (43) associated to the service code, and carries out a call (68) to this telephone terminal (43) of the contact centre (4), transmitting to the contact centre (4) a connection code (67xxxx) for the agent,
the agent in the contact centre (4) picks up the telephone terminal (43),
the secondary automatic private centre (3) links the telephone (51) of the user to the telephone terminal (43) of the contact centre (4) for establishing a bidirectional audio communication, and the main server (1) creates in a videoconferencing server a videoconference virtual room to which the remote computer (52) of the user automatically gains access,
the agent in the contact centre (4) introduces the received connection code (70) in the computer (44) of the contact centre (4) for the routing to the videoconference virtual room (71).

3. The procedure of claim 2, characterized in that the database of the main server (1) comprises, for each form filled out by a user, a unique register comprising as fields, at least, a unique identifier, the data in the form, the telephone number (51) of the user, the service code generated from the form, the number of the telephone terminal (43) of the contact centre (4), the connection code for the contact centre (4) and the routing to the videoconference virtual room in which the remote computer (52) of the user, the videoconferencing server and the computer of the contact centre are connected.

4. The procedure of claim 2, characterized in that the secondary automatic private centre (3) carries out a call (68) to the telephone terminal (43) of the contact centre (4) using as number of telephone identification the connection code.

5. The procedure of claim 2, characterized in that the videoconference virtual room is configured in the format of a videoconference room stored in a database of the main server (1), and selected according to the service code.

6. The procedure of claim 2, characterized in that the main server (1) enables in the videoconference virtual room a service of bidirectional communication of low bandwidth between the remote computer (52) of the user and the computer (44) of the contact centre (4).

7. The procedure of claim 6, characterized in that, in the moment when said telephone communication between the user and the agent of the contact centre (4) is ended, the videoconference virtual room (73) is eliminated, disconnecting the contact centre (4) and the remote computer (52) of the user, and the connection code assigned to the user is released.

8. The procedure of claim 2, characterized in that it comprises the transmission of images and graphic data from the database of the main server (1) to the videoconference virtual room to which the remote computer (52) of the user is connected.

9. The system of claim 1, characterized in that the database of the main server (1) includes forms filled by users wherein, for each form, a unique register, a unique identifier, data in the form, the telephone number (51) of the user, the service code generated from the form, the number of the telephone terminal (43) of the contact centre (4), the connection code for the contact centre (4) and the routing to the videoconference virtual room in which the remote computer (52) of the user, the videoconferencing server and the computer of the contact centre are connected.

10. The system of claim 1 wherein the secondary automatic private centre (3) is adapted to complete a call (68) to the telephone terminal (43) of the contact centre (4) using as number of telephone identification the connection code.

11. The system of claim 1 wherein the videoconference virtual room is configured in the format of a videoconference room stored in a database of the main server (1), and selected according to the service code.

12. The system of claim 1 wherein the main server (1) is adapted to operate the videoconference virtual room to perform a service of bidirectional communication of low bandwidth between the remote computer (52) of the user and the computer (44) of the contact centre (4).

13. The system of claim 1 wherein immediately after telephone communication between the user and the agent of the contact centre (4) is ended, main server is adapted to eliminate the videoconference virtual room (73), and to disconnect the contact centre (4) and the remote computer (52) of the user, and to release the connection code assigned to the user.

14. The system of claim 1 wherein said main server (1) is adapted to transmit images and graphic data from the database of the main server (1) to the videoconference virtual room to which the remote computer (52) of the user is connected.

* * * * *